United States Patent Office 3,441,532
Patented Apr. 29, 1969

3,441,532
LIQUID POLYAMIC ACID COMPOSITION AND
PROCESS FOR PREPARING SAME
Claus Victorius, Media, Pa., assignor to E. I. du Pont de
Nemours and Company, Wilmington, Del., a corporation of Delaware
No Drawing. Filed Jan. 14, 1966, Ser. No. 520,638
Int. Cl. C08g 51/26, 41/02
U.S. Cl. 260—30.4                                   9 Claims

ABSTRACT OF THE DISCLOSURE

The disclosure shows a process for preparing a suspension of polyamic acid polymer particles in an ether, which process is adapted to provide a liquid composition of the polymer having low viscosity at high solids content and having beneficial utility in the preparation of curable polyamic acid layers; the process comprises a polymer-forming reaction between a dianhydride and a diamine in a suitable ether which does not dissolve the polymer.

---

This invention relates to a liquid composition containing a polyamic acid polymer, to a process for preparing this polymeric composition and to the dried polymer deposited from this composition.

It is known that articles containing a heat-resistant coating or bonding layer of polyimide polymer can be prepared by (1) preparing a solution in a volatile organic solvent (e.g. N,N-dimethylacetamide or N,N-dimethylformamide) of a polyamic acid, (2) applying a layer of the polyamic acid solution to a suitable substrate by conventional liquid coating procedures, and (3) heating the applied layer in an oven to evaporate the solvent and to convert the polyamic acid to polyimide.

Although the known solution-type polyamic acid compositions are very useful for some applications, for other applications their utility is seriously limited. For example, it is known in the art that the polyamic acid content of these known solution-type compositions must be kept relatively low in many applications so that the viscosity will be low enough to permit the use of a conventional liquid coating apparatus. Several coating and drying cycles are often necessary to build up the required coating thickness with the low-solids composition. Also, when the applied layer of the solution composition is dried and then used as a bonding layer in the manufacture of laminated articles, the very limited flow of the polymer and the large amount of volatile material liberated during the hot pressing operation are often definite drawbacks.

The present invention provides, as a new and useful liquid composition, a suspension of polyamic acid polymer particles in a volatile liquid consisting essentially of an ether which is substantially a non-solvent for said polymer.

This invention also provides a dried polyamic acid polymer which unexpectedly has better flow properties and which liberates less volatile material in hot-press lamination applications than the polymer deposited from the solution-type compositions mentioned above. The polymer of this invention is obtained by drying the liquid composition described in the preceding paragraph; preferably enough of the volatile liquid is evaporated from the composition so that less than 15% of volatile material (based on the weight of dried polymer) is liberated when curing the polymer at a temperature above 195° C. In preferred embodiments of the invention the polymer has a softening point of less than 250° C. Usually some of the amic acid groups of the dried polyamic acid polymer have been converted to imide groups; thus, the polymer can also be referred to as a polyamic acid-polyimide polymer.

The invention also provides a process which comprises reacting with agitation (A) a dianhydride and (B) a diamine in a volatile liquid medium consisting essentially of an ether until there is formed a suspension of polyamic acid polymer particles in said volatile liquid, said ether being (1) a solvent for at least one of the reactants (A) and (B), and (2) substantially a non-solvent for said polymer, the meaning of "solvent" and "non-solvent" in this sentence is described below.

In the liquid composition of this invention, the volatile liquid ether is preferably a cyclic ether; especially preferred cyclic ethers include tetrahydrofuran (a cyclic monoether), 1,4-dioxane (a cyclic diether) and mixtures thereof. Also included among the useful ethers are the cyclic ethers furan, 1,3-dioxane and trimethylene oxide, as well as the non-cyclic diethers glyme (1,2-dimethoxyethane) and bis(2-ethoxyethyl)ether and the non-cyclic ether diphenyl ether (an aromatic monoether).

The ether is substantially a non-solvent for the polyamic acid at temperatures below the polyamic acid curing temperature; and the ether undergoes no harmful reaction with the polyamic acid.

In the suspension of this invention, the polyamic acid usually has a solubility in the ether of less than 5% by weight of ether; however, in some useful embodiments of the invention the polymer solubility is as high as 20–30%. The ether can be evaporated from the composition at practical oven-drying temperatures, for example at about 50 to 135° C.

The amount of polyamic acid present in the suspension is selected to fit the particular end use. For most applications wherein the liquid composition is employed to deposit a layer of polyamic acid on a substrate (e.g. for bonding or laminating purposes), the weight ratio of polyamic acid to ether is usually about 1:99 to 60:40, preferably about 20:80 to 50:50.

In the light of the present disclosure, a person skilled in the polyamic acid art will be able to select suitable reactants for the preparation of the suspension and polymer of the present invention. The dianhydride and diamines used in preparing any of the known polyamic acid polymers can be employed in preparing the polyamic acid polymer of this invention. The disclosures of useful dianhydrides and diamines in the following publications are incorporated herein by reference: U.S. Patents 3,179,614; 3,179,634; 3,190,856; British Patent 935,388; and Dutch Patent Application No. 6,400,422, published July 22, 1964.

The polyamic acid of the liquid composition of this invention usually is one having recurring units of the formula

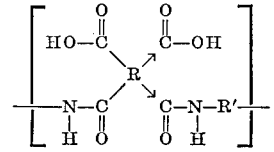

wherein→denotes isomerism, R is an organic tetravalent radical containing at least two carbon atoms, no more than two carbonyl groups of each polyamic acid unit being attached to any one carbon atom of said tetravalent radical, and R' is a divalent radical containing at least two carbon atoms, each of the amide groups of adjacent polyamic acid units being attached to separate carbon atoms of said divalent radical.

The polyamic acid polymer generally preferred in practicing this invention consists essentially of units of (A) a dianhydride from the group consisting of 3,4,3',4'-benzophenonetetracarboxylic dianhydride and pyromellitic dianhydride and (B) a diamine from the group consisting of 4,4'-oxydianiline, 4,4'-methylene dianiline and m-phenylene diamine. As commonly used in the art, "units of" herein means "units from the reaction of" the materials listed. A polyamic acid which is particularly useful in adhesive applications is the product of reacting in a medium of tetrahydrofuran or 1,4-dioxane the reactants (A) 3,4,3',4'-benzophenone-tetracarboxylic dianhydride and (B) 4,4'-methylene dianiline, the molar ratio of (A) to (B) being about 40:60 to 43:57.

The process of the present invention is carried out by forming a mixture of (A) a suitable dianhydride and (B) a suitable diamine in a volatile liquid consisting essentially of an ether, and agitating the resulting mixture while reactants (A) and (B) are allowed to react to form polyamic acid. The reaction is carried out at a temperature below 175° C., preferably below 60° C. There results from this reaction a suspension of polyamic acid particles in the volatile liquid.

The volatile liquid with which the reactants (A) and (B) are mixed must be able to dissolve enough of at least one of the reactants to permit the polyamic acid-forming reaction to take place. Usually at least 5% of the weight of at least one of the reactants present must be soluble in the volatile ether. Preferably both reactants have some solubility and at least one of the reactants (usually the diamine) has 50 to 100% solubility in the ether, based on the weight of the reactant used. Thus, the ether is a "solvent" for one or both of the reactants.

The liquid reaction medium preferably consists essentially of tetrahydrofuran, 1,4-dioxane or a mixture of these two liquids. The volatile liquid with which the liquids are mixed also must be substantially a non-solvent for the polyamic acid in the sense explained above.

The order in which the components are added to the reaction vessel is not critical so long as intimate contact between reactants is achieved. Soluble reactants are conveniently added in the form of solutions, and compounds which are insoluble in the liquid or liquids utilized in any particular instance are desirably mixed with one of the liquids to form a slurry thereof and then added to the reaction mixture. Alternatively, solid reactants can simply be placed in a reaction vessel and the liquid used as reaction medium added thereto with mixing.

Additives known to be useful in liquid polymeric compositions can be added to the liquid composition of this invention in an amount that permits retention of the desired properties of the composition and dried polymer formed therefrom, for example pigments, dyes, fireproofing agents, curing agents, antisettling agents and small amounts of volatile liquids other than cyclic ethers in which the polyamic acid is substantially insoluble.

The liquid composition of this invention can have a surprisingly high polyamic acid content and still have a low enough viscosity to permit the use of a conventional liquid coating procedure, for example knife-coating, roller-coating, dip-coating and the like. A single coat of the high-solids composition of this invention sometimes suffices where two or three coats are necessary with the solution-type polyamic acid composition.

A layer of the liquid composition of this invention can be applied to a substrate and the volatile liquid evaporated to form a layer of dried polyamic acid. The amount of volatile material liberated while curing the dried polyamic acid layer can be considerably less than with the known solution-type compositions mentioned above. The invention makes it possible to manufacture many articles more efficiently and to obtain better quality products.

The suspension can be used to make shaped polyimide articles by (1) separating the polyamic acid from most of the volatile liquid, for example by means of a vacuum filter apparatus or centrifuge, (2) evaporating more of the volatile liquid from the polyamic acid, (3) reducing the dried mass of polyamic acid to the desired particle size and (4) using a conventional molding press or other suitable apparatus to shape and cure the polyamic acid under heat and pressure. Venting methods well known in the molding art can be employed to permit the escape of any volatile matter liberated during the curing operation. Cured products are obtainable in this manner which are strong, heat-resistant, inert to water and many chemicals, and having desirable electric insulation properties.

The examples which follow are given for the purpose of illustrating the invention. All quantities shown are on a weight basis unless otherwise indicated. Each viscosity value given is Brookfield viscosity in poises at 25° C. All reactants and ethers used are reagent grade, anhydrous.

EXAMPLE 1

In this example, THF means tetrahydrofuran, BTDA means 3,4,3',4' - benzophenone - tetracarboxylic dianhydride, and MDA means 4,4'-methylene dianiline.

The polyamic acid prepared in this example consists of units of BTDA and MDA in a molar ratio of about 40:60.

A suspension of the polyamic acid in THF is prepared by (1) charging a one-quart reaction jar equipped with a high-shear stirring device (e.g. an Oster disintegrator or Waring Blendor) with 58.2 grams (0.294 mole) of MDA and 150 grams of THF; (2) stirring the contents of the jar until the MDA is dissolved in the THF; (3) cooling the resulting solution to 20° C. by placing the jar in an ice bath; (4) adding to the solution 64.4 grams (0.2 mole) BTDA gradually with vigorous stirring over a period of 10 minutes while keeping the reaction mixture at about 25° C.; (5) rinsing the BTDA container with 34 parts of THF and emptying the container into the jar; (6) stirring the contents of the jar vigorously for another 10 minutes and then stirring gently for 40 minutes (all at 25° C.) to complete the reaction which forms fine solid yellow particles of polyamic acid suspended in THF. Any of the particles which settle out on standing can be readily redispersed by stirring the suspension.

The resulting polyamic acid suspension has a polyamic acid content of 40% and a viscosity of 0.5.

A bonding tape is prepared by (1) applying enough of the 40% suspension to both side of a Fiberglas Type 112E heat-cleaned glass fabric by means of a conventional roller-coating apparatus (an ordinary paint brush can also be used) so that the coated/impregnated fabric has a polyamic acid content after drying of 71%; and (2) drying the coated fabric for one hour at 25° C. and for five minutes at 135° C.

When the dried polyamic acid-coated bonding tape is heated for one hour at 260° C., the amount of volatile material liberated is surprisingly low (i.e. 6.5% by weight of the dried bonding tape, or 9.1% by weight of the dried polymer). A sample of the bonding tape is placed between two microscope slides and heated; the polyamic acid melts at about 150° C. One skilled in the art will recognize this as quite unexpected since the polyamic acid layers deposited from known solution-type compositions not only do not melt at this temperature but also generally have no definite melting point.

Two 1-inch by 4-inch strips of 0.05-inch thick stainless steel are bonded together with this bonding tape. First, the steel strips are prepared for bonding by (1) wiping them with a clean cloth wet with methyl ethyl ketone; (2) scrubbing them with a cloth dipped in water and in pumice powder; (3) immersing one end of each strip to a depth of one inch for two minutes in an etching bath heated to 88° C., the bath consisting of 85.5 parts of 35% HCl, 9.0 parts of 85% $H_3PO_4$ and 5.5 parts of 48% HF; (4) rinsing the strips with mineral-free water; and (5) drying them for 15 minutes at 93° C.

The steel strips are bonded by (a) laying them end-to-end and placing the etched portion of one strip in superposed relation with the etched portion of the other strip so that there is a ½-inch overlap; (b) placing the bonding tape in interposed relation with the strips in the area of the overlap; (c) placing the sandwiched assembly in a heated press; (d) subjecting the assembly to a pressure of 50 p.s.i. and a temperature of 260° C. for one hour; (e) transferring the laminate to an oven and heating it for 64 hours at 260° C.; (f) cooling the laminate to room temperature. During the early stages of the curing cycle, the polyamic acid has surprisingly good flow properties. The polyamic acid of the bonding layer, now fully cured, has all been converted to polyimide. A force of 3,000 p.s.i. is required to separate the two steel strips at 25° C. when tensile-shear-tested at a cross-head speed of 0.02 inch per minute in an Instron Tensile Tester. The strips also remain strongly bonded at elevated temperatures, for example at 280° C. to 370° C.

EXAMPLE 2

Results similar to those obtained in Example 1 are obtained by repeating Example 1 except for the following differences:

(a) The THF is replaced with 1,4-dioxane;
(b) The portion of the MDA that does not dissolve in the 1,4-dioxane is dispersed therein as fine particles;
(c) The polamic acid suspension has a viscosity of 1.5;
(d) The coated fabric is dried for 1 hour at 100° C.;
(e) The dried bonding tape has a polyamic acid content of 77%;
(f) The dried polyamic acid melts at about 232° C.;
(g) When the dried bonding tape is heated for one hour at 260° C., the amount of volatile material liberated is 7.4% by weight of the dried bonding tape, or 9.6% by weight of the dried polymer.

EXAMPLE 3

Results similar to those obtained in Example 1 are obtained by repeating Example 1 except (a) The THF is replaced with diphenyl ether (DPE);
(b) The amount of ether added is modified so that the suspension obtained has a polyamic acid content of 30%; and
(c) The polyamic acid suspension is prepared by (1) placing the reaction mixture of MDA, DPE and BTDA in a wide-mouth glass jar; (2) filling the jar with glass beads to the top of the reaction mixture; (3) putting a cover on the jar; (4) placing the jar in a metal container and packing shredded paper around the jar; (5) rotating the resulting assembly on a set of rollers for 16 hours at 25° C.; and (6) passing the suspension obtained through a muslin paint strainer to separate it from the glass beads. The resulting suspension, although having thixotropic properties, has a low enough viscosity under slight agitation to pass through the muslin strainer.

EXAMPLE 4

Results similar to those obtained in Example 2 are obtained by repeating Example 2 except (a) The 0.294 mole of MDA is replaced with 0.2 mole of MDA giving a molar ratio of BTDA to MDA of 50:50; and
(b) The 1,4-dioxane is replaced with glyme, which completely dissolves the MDA.

The suspension is preferably stirred gently until it is used to be sure that the polyamic acid particles are kept in suspension.

EXAMPLE 5

Results similar to those obtained in Example 4 are obtained by repeating Example 4 except (a) The glyme is replaced with diphenyl ether,
(b) The amount of ether added is modified so that the suspension obtained has a polyamic acid content of 20%; and
(c) The polyamic acid suspension is prepared by rotating the reaction mixture in a jar containing glass beads as described in Example 3.

EXAMPLE 6

Results similar to those obtained in Example 4 are obtained by repeating Example 4 except the glyme is replaced with bis(2-ethoxyethyl)ether. The suspension can be allowed to stand for several days without agitation and then agitated before use to redisperse any polyamic acid particles which have settled out.

EXAMPLE 7

In this example, ODA means 4,4'-oxydianiline, and PMDA means pyromellitic dianhydride. The polyamic acid prepared in this example consists of units of PMDA and ODA in a molar ratio of 50:50. A suspension of this polyamic acid in THF is prepared by (1) charging a one quart reaction jar with 30.0 grams (0.15 mole) of ODA and 250.8 grams THF, the reaction jar being a Waring Blendor equipped with an explosion-proof motor; (2) stirring the contents of the jar until the ODA is well dispersed and partly dissolved in the THF; (3) cooling the resulting mixture to 20° C. in an ice bath; (4) adding to the mixture 32.7 grams (0.15 mole) of PMDA gradually with vigorous stirring over a period of 5 minutes; (5) stirring the contents of the jar vigorously for another 15 minutes at 25° C. to complete the reaction which forms fine solid yellow particles of polyamic acid suspended in THF.

The resulting suspension is useful for the preparation of dried polyamic acid having a low polyimide content and low liquid content from which polyimide molded articles can be made by known molding procedures in a heated press.

EXAMPLE 8

Results similar to those obtained in Example 7 are obtained by repeating Example 7 except the THF is replaced with 1,4-dioxane.

EXAMPLE 9

Results similar to those obtained in Example 7 are obtained by repeating Example 7 except (a) The THF is replaced with diphenyl ether;
(b) The amount of ether added is modified so that the suspension obtained has a polyamic acid content of 20%; and
(c) The polyamic acid suspension is prepared by rotating the reaction mixture in a jar containing glass beads as described in Example 3.

I claim:
1. A process which comprises reacting with agitation, at a polymer-forming temperature below 175° C., a (A) a dianhydride and (B) a diamine in a volatile liquid medium consisting essentially of an ether until there is formed a suspension of polyamic acid polymer particles in said volatile liquid, said ether being (1) a solvent for at least one of the reactants (A) and (B), (2) substantially a non-solvent for said polymer, and (3) at least one member selected from the group consisting of tetrahydrofuran, 1,4-dioxane, furan, 1,3-dioxane, trimethylene oxide, 1,2 - dimethoxyethane, bis(2 - ethoxyethyl)ether and diphenyl ether.

2. A process according to claim 1 wherein said ether is at least one member from the group consisting of tetrahydrofuran and 1,4-dioxane.

3. A process according to claim 2 wherein reactant (A) is 3,4,3',4'-benzophenone-tetracarboxylic dianhydride, reactant (B) is 4,4'-methylene dianiline, and the molar ratio of (A) to (B) is about 40:60 to 43:57.

4. As a new liquid composition, a suspension of polyamic acid polymer particles in a volatile liquid consisting essentially of an ether which is substantially a non-solvent for said polymer, the weight ratio of said polymer to said ether being about 1:99 to 60.40, and said composition being a product obtained by the process of claim 1.

5. A composition according to claim 4 wherein said ether is at least one member from the group consisting of tetrahydrofuran and 1,4-dioxane.

6. A composition according to claim 5 wherein the weight ratio of said polymer to said ether is about 20:80 to 50:50.

7. A composition according to claim 4 wherein said polymer consists essentially of units of (A) a dianhydride from the group consisting of 3,4,3',4'-benzophenone-tetracarboxylic dianhydride and pyromellitic dianhydride and (B) a diamine from the group consisting of 4,4'-oxydianiline, 4,4'-methylene dianiline and m-phenylene diamine.

8. A composition according to claim 7 wherein (A) is 3,4,3',4'-benzophenone-tetracarboxylic dianhydride, (B) is 4,4'-methylene dianiline, the ether is as described in claim 2 and the molar ratio of (A) to (B) is about 40:60 to 43:57.

9. A polyamic acid polymer obtained by drying the liquid composition described in claim 4.

References Cited

UNITED STATES PATENTS

| 3,179,614 | 4/1965 | Edwards. | |
|---|---|---|---|
| 3,249,588 | 5/1966 | Gall | 260—78 |

FOREIGN PATENTS 6,406,807  12/1964  Netherlands.

MORRIS LIEBMAN, *Primary Examiner.*

L. T. JACOBS, *Assistant Examiner.*

U.S. Cl. X.R.

260—33.2, 78